No. 796,749. PATENTED AUG. 8, 1905.
J. F. McELROY.
ELECTRIC CAR LIGHTING.
APPLICATION FILED OCT. 6, 1902.

2 SHEETS—SHEET 2.

Witnesses:
Raphaël Netter
C. D. Morrill

Inventor
James F. McElroy
by E. M. Bentley, Atty

UNITED STATES PATENT OFFICE.

JAMES F. McELROY, OF ALBANY, NEW YORK, ASSIGNOR TO CONSOLIDATED CAR HEATING COMPANY, OF ALBANY, NEW YORK, A CORPORATION OF WEST VIRGINIA.

ELECTRIC CAR-LIGHTING.

No. 796,749.      Specification of Letters Patent.      Patented Aug. 8, 1905.

Original application filed February 20, 1899, Serial No. 706,165. Divided and application filed September 9, 1901, Serial No. 74,769. Again divided and this application filed October 6, 1902, Serial No. 126,011.

*To all whom it may concern:*

Be it known that I, JAMES F. MCELROY, a citizen of the United States, residing at Albany, county of Albany, and State of New York, have invented certain new and useful Improvements in Electric Car-Lighting, of which the following specification, together with the accompanying drawings, illustrates one form of the invention, which I now regard as the best out of the various forms in which the principle of the invention may be embodied.

Figure 1:
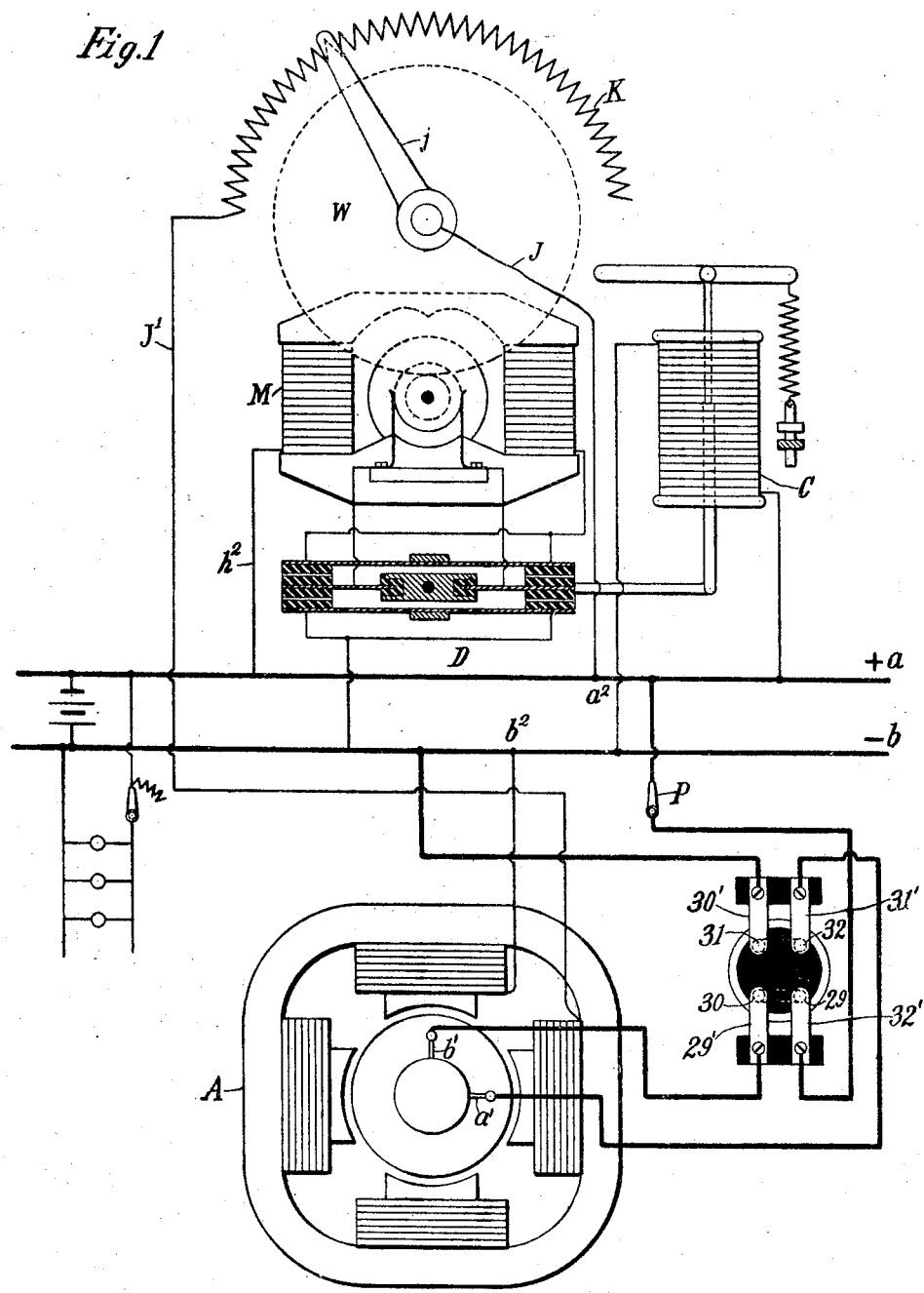
Figure 2:
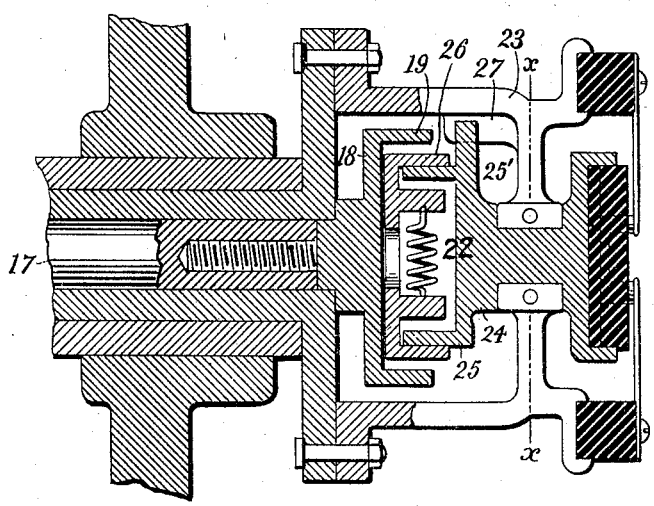
Figure 3:
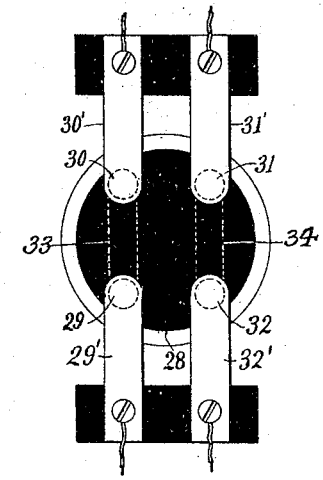
Figure 4:
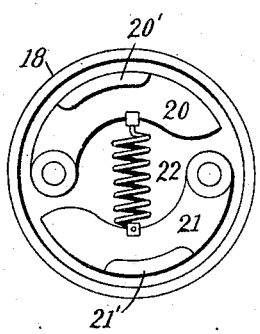
Figure 5:
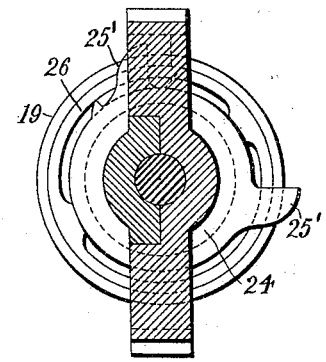

In the accompanying drawings, Figure 1 shows diagrammatically a dynamo-electric machine and its regulating apparatus with my invention applied thereto; Fig. 2 shows a vertical section of my invention applied to the shaft of a dynamo-electric machine; Fig. 3 is an end view thereof; and Figs. 4 and 5 illustrate details of construction.

The present application is a division of an application filed by me September 9, 1901, Serial No. 74,769, which in turn is a continuation of a still earlier application filed February 20, 1899, Serial No. 706,165.

My invention relates to a reversing device suitable for use under the conditions involved in a system of electric train-lighting devised by me, and shown in the aforesaid application, Serial No. 74,769, which is characterized by the operation of the dynamo which supplies the lighting-current from the car-axle, and by the use of a storage battery charged by the dynamo. In that system the connection of the dynamo to the battery and lamps is effected by means of a switch in the main line whose closure is controlled by a shunt-magnet on the generator side of the switch. In order that the battery-current shall not flow back through the generator, it is needful that the field-magnet of the generator be fully energized at the moment when the armature is connected to the storage battery. It is also required that the generator must be reversible in order that it may operate in both directions of movement of the vehicle, while at the same time the current flowing to the storage battery must always be in the same direction. To meet these conditions, I have devised an arrangement wherein in the first place the dynamo is self-exciting, its field-magnet current being derived from the armature-current generated by the dynamo itself and not from the storage battery. By this means the dynamo will itself produce its own full field-magnet strength prior to the time of its connection to the storage battery, which connection only occurs when a definite speed of the dynamo has been reached, and the shunt-magnet controlling the closure of the connection-switch thereby energized to the required degree. I also in the second place connect the field-magnet of the dynamo in a shunt or derived circuit from the armature, and at a point in the dynamo armature-circuit between the terminals of the machine and the point at which the field-magnet circuit is derived I insert a reversing-switch and provide means for operating such switch automatically by the reversible driving-shaft without a continuous frictional engagement of such switch with the shaft in a manner to be hereinafter described. By this means I insure that the dynamo will start into action when its direction of rotation is reversed, which it would not do if the reversing-switch were placed in the field-magnet circuit instead of the armature-circuit, so as to reverse the polarity of the field-magnet at the same time that the direction is reversed. In other words, I provide that the self-excitation of the dynamo shall be always in the same direction, while a reversal of direction of the armature will reverse the armature-current, this being essential to make the machine start into action, while such current reversal is confined to the armature-circuit by means of the reversing-switch therein which maintains a constant direction of current-flow in the main line outside of said switch, at which point also the field-magnet circuit is connected. Another advantage of this arrangement is that in event of the reversing-switch failing to act the machine will not build up in the wrong direction, so that when the battery is connected it will short-circuit through the machine; but, on the contrary, the dynamo will not start into action at all under the contingency just mentioned. In other words, the dynamo will not start at all unless it starts right, and the short-circuiting of the battery by the dynamo is completely eliminated.

In order to provide for the automatic operation of the reversing-switch located as above described, I arrange for a mechanical engagement between the switch and the driving-shaft which will give the switch a movement in one direction or the other, according to the direction of the shaft, and in order that this engagement may not continue after the switch has been fully operated I arrange a centrifugal device which interrupts such engagement after the switch has been thrown.

Referring to the accompanying drawings, particularly Fig. 2, I attach to one end of the dynamo-shaft 17 a wheel 18, provided with a rim 19. On the face of the wheel 18 are arranged two curved levers 20 and 21, (see Fig. 4,) each pivoted near one end to the wheel and each provided with a projection, which projections are numbered 20' and 21', respectively. A spring 22 connects said levers and tends to draw them toward each other. As thus arranged it is apparent that with the rapid motion of the dynamo-shaft the levers 20 and 21 will tend to separate against the tension of said spring. Mounted in a suitable frame 23, Fig. 2, which is secured to the frame in which the dynamo-shaft 17 is mounted, I arrange a wheel 24, provided with a rim 25, adapted to come in contact with the projections 20' and 21' on the levers 20 and 21, the parts being so arranged that when the wheels are still or moving slowly the projections 20' and 21' will make close contact with the rim 25 on the wheel 24, and in consequence the movement of the wheel 18 on the dynamo-shaft when the dynamo is starting will move the wheel 24. The wheel 24, however, is limited in its motion, preferably, to one-quarter of one turn as the limit, being stopped by the projection 25' on the wheel 24 coming in contact with the stationary portion 27 of the frame 23. The wheel 24 is provided with a face 28 (see Fig. 3) on the side of the wheel opposite that upon which the rim 25 is placed, and on this face 23 are countersunk four contacts 29, 30, 31, and 32, equally spaced and preferably at equal distances from the center. Four corresponding brushes 29', 30', 31', and 32' are mounted in insulated blocks in the frame 23. The contacts 29, 30, 31, and 32 are joined in pairs within the stationary wheel by means of the insulated contacts 33 and 34, respectively. Connected with the brushes 29', 30', 31', and 32' are wires leading to the armature and to the mains, as shown in Fig. 1. When the dynamo starts and is revolving slowly, the pressure of the projections 20' and 21' on the wheel 18 will cause the wheel 24 to make a partial revolution, which will operate the contacts 29, 30, 31, and 32 and will cause them to assume in reference to the brushes either the position shown in Fig. 3, in which the current passes from brush 29' to brush 30' and from brush 32' to brush 31', or on the wheel being revolved in the opposite direction by the reverse movement of the dynamo-shaft from brush 29' to brush 32' and from brush 30' to brush 31', the insulated connecting-pieces 33 and 34, then occupying a position (shown in Fig. 1) at right angles to that which they occupy in Fig. 3. In the latter position the circuit may be traced in Fig. 1 as follows: from dynamo-terminal $a'$ to brush 31', to contact 32, to contact 31, to brush 30', to main $b$, thence through the translating devices connected to the mains to the opposite main $a$, thence to brush 32', to contact 29, to contact 30, to brush 29', to the opposite dynamo-terminal $b'$. In the opposite position—to wit, that shown in Fig. 3—the circuit will be from dynamo-terminal $a'$ to brush 31', to contact 31, to contact 32, to brush 32', to main $a$, thence through the translating devices to main $b$, thence to brush 30', to contact 30, to contact 29, to brush 29', to dynamo-terminal $b'$. In the one case the terminal $a'$ will be connected to main $b$ and the terminal $b'$ to to main $a$, while in the other case the terminal $a'$ will be connected to main $a$ and the terminal $b'$ to main $b$. It will be understood that the direction of current in the fields of the dynamo and the fields of polarity remain the same, this being provided for by locating the reversing-switch just described between the brushes of the dynamo and the main line and by deriving the shunt-circuit for energizing the field from the main lines themselves, as shown in Fig. 1, and by thus changing the direction of the current from the armature to the mains the direction of current on the mains is maintained the same, regardless of the direction in which the car is moving. If the dynamo is speeded up, the centrifugal force will remove the pressure of the projections 20' and 21' on the levers 20 and 21 from the rim 25. The wheel 24, which carries the contacts, as aforesaid, will remain stationary and unaffected by said levers. It is only when the dynamo slows down that there is any friction between the projections on the levers and the rim of the wheels. There is just sufficient motion given to the wheel to make the change in connection, and this change is only made when the direction of movement of the car is reversed.

The apparatus shown in Fig. 1, additional to that just described, forms no part of the present invention; but it may be mentioned that the main circuit supplied by the dynamo is indicated by the lines $a$ and $b$, and the current from the dynamo passes thereto from the brushes $a'$ and $b'$ through the intervening reversing-switch described above. The field-magnet circuit aforesaid starts from the main $a$ at the point $a^2$ and passes by the wire J to the rotating arm $j$ of the rheostat which sweeps over the resistance K, so as to bring more or less of the resistance into circuit. It then passes from the resistance K by the wire $J'$ through the field-magnet coils of the dynamo A and returns to the main $b$ at the point $b^2$. The strength of the field-magnet is regulated by the resistance K, the value of which is determined by the position of the arm $j$, operated in one direction or the other by the motor M. The field-magnet of the motor is in a shunt-circuit from the main $a\ b$. The armature-circuit of the motor is in another shunt-circuit containing a reversing-switch or current-director D, operated by the shunt-magnet C. The magnet C measures the potential or electromotive force on the mains $a$ and $b$, and whenever that potential is too great or too small the magnet operates the director D to introduce current in one direction or the other into the armature of the motor M, which in turn operates the rheostat-arm $j$ to correct the departure from the normal potential by increasing or decreasing the power of the dynamo through a decrease or increase in the amount of resistance K, contained in its field-magnet circuit. The connection between the dynamo A and the mains $a$ and $b$ will be established by means of the switch P. This switch is of a kind well known to the art, which is closed automatically when the speed and voltage of the dynamo reach the desired point and opens again when the speed and voltage fall below that point. This is ordinarily provided for by means of a shunt-magnet acting when sufficiently energized to close the switch, supplemented by a series magnet which holds the switch closed after the shunt-magnet has acted and works in opposition to the shunt-magnet to promote the releasing and opening of the switch when the excitation of the shunt-magnet falls below the normal operative value and storage-battery current tends to flow back through the series coil to the dynamo. Since this apparatus is now well known to the art, it has not been considered necessary to illustrate it in detail in the drawings.

What I claim as new, and desire to secure by Letters Patent, is—

1. In a system of electric lighting for railway-vehicles, the combination of a storage battery, a self-excited and reversible dynamo driven by an axle and having its field-magnet coils in a shunt-circuit derived from the armature-circuit, a switch for connecting the dynamo to the battery, a reversing-switch in the armature-circuit at a point between the armature-terminals and the point of derivation of the field-magnet circuit, a mechanical connection between said switch and a reversible shaft, and means for interrupting said connection when a given speed is reached.

2. In a system of electric lighting for railway-vehicles, the combination of a storage battery, a self-excited and reversible dynamo driven by an axle and having its field-magnet coils in a shunt-circuit derived from the armature-circuit, a switch for connecting the dynamo to the battery, a reversing-switch in the armature-circuit at a point between the armature-terminals and the point of derivation of the field-magnet circuit, a mechanical connection between said switch and a reversible shaft, and centrifugal means for interrupting said connection when a given speed is reached.

3. In a system of electric lighting for railway-vehicles, the combination of a storage battery, a self-excited and reversible dynamo driven by an axle and having its field-magnet coils in a shunt-circuit derived from the armature-circuit, a switch for connecting the dynamo to the battery, a reversing-switch in the armature-circuit at a point between the armature-terminals and the point of derivation of the field-magnet circuit, a mechanical connection between said switch and a reversible shaft, a spring to produce the engagement of said connection and centrifugal means for counteracting the spring as the speed increases.

4. In a system for lighting railway-vehicles electrically, the combination with a constant-potential generator driven by an axle, and having its field-magnet strength independent of the reversals of the armature-current, lamps and a storage battery, a switch in the main-line circuit between the said lamps and battery and the generator, a shunt-magnet on the generator side of said switch controlling its closure, a shunt-field-magnet circuit also on the generator side of the switch, a reversing-switch in the main circuit between the shunt-field-magnet circuit and the terminals of the generator, a clutching device between the said reversing-switch and the driving-axle for operating the said switch in one direction or the other, according to the direction of the vehicle, and a centrifugal governor for throwing said clutching devices out of action at a predetermined speed.

5. In a system for lighting railway-vehicles electrically, the combination with an axle, of a generator driven thereby, having a shunt-coil on its field-magnet, electric lamps and a storage battery supplied thereby, a reversing-switch in the armature-circuit between the commutator-brushes and the point of connection of the shunt-field coil, to the said armature-circuit, a clutching device for operating the reversing-switch, and a centrifugal governor for disengaging the clutching device at a determined speed.

6. In a system for lighting railway-vehicles electrically, the combination with an axle, of a generator driven thereby, having a shunt-coil on its field-magnet, a storage battery supplied by said generator, a reversing-switch in the armature-circuit between the brushes and the connection-point of the said shunt-circuit, a clutching device for operating the reversing-switch, and a centrifugal governor for disengaging the clutching device at a determined speed.

In witness whereof I have hereunto set my hand, this 29th day of September, 1902, before two subscribing witnesses.

JAMES F. McELROY.

Witnesses:
BEULAH CARLE,
WILLIAM A. MORRILL, Jr.